(12) United States Patent
Aoki et al.

(10) Patent No.: US 7,771,238 B2
(45) Date of Patent: Aug. 10, 2010

(54) CARD-TYPE PERIPHERAL DEVICE

(75) Inventors: Yoshitaka Aoki, Kanagawa (JP); Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/229,767

(22) Filed: Aug. 27, 2008

(65) Prior Publication Data

US 2009/0061688 A1 Mar. 5, 2009

(30) Foreign Application Priority Data

Aug. 31, 2007 (JP) .............................. 2007-227206

(51) Int. Cl.
*H01R 24/00* (2006.01)

(52) U.S. Cl. ...................... 439/630; 325/441

(58) Field of Classification Search ......... 439/630–632; 235/441
See application file for complete search history.

(56) References Cited

U.S. PATENT DOCUMENTS

| 7,057,268 | B1 * | 6/2006 | d'Estries .................. 257/679 |
| 7,172,464 | B1 * | 2/2007 | Lee ........................... 439/630 |
| 7,210,967 | B1 * | 5/2007 | Lee ........................... 439/630 |
| 7,325,745 | B2 * | 2/2008 | Chang et al. .............. 235/486 |
| 7,427,026 | B2 * | 9/2008 | Kojima et al. ............. 235/441 |
| 2005/0138288 | A1 | 6/2005 | Chou et al. |
| 2005/0258243 | A1 * | 11/2005 | Hsieh ........................ 235/441 |
| 2008/0071963 | A1 | 3/2008 | Chow et al. |
| 2009/0063743 | A1 | 3/2009 | Aoki et al. |
| 2009/0077295 | A1 | 3/2009 | Konno et al. |

FOREIGN PATENT DOCUMENTS

| JP | 04-124790 A | 4/1992 |
| JP | 10-334206 A | 12/1998 |
| JP | 2005-050280 A | 2/2005 |
| JP | 2005-284323 A | 10/2005 |
| JP | 2006-106826 A | 4/2006 |
| JP | 2006-185677 A | 7/2006 |

OTHER PUBLICATIONS

Nikkei Electronics, "Lending Trends", Jun. 9, 2003, pp. 67-76.
PCMCIA: "The ExpressCard™ Standard—The Next Generation PC Card Technology" Oct. 2003, Retrieved from the Internet: URL: http://www.expresscard.org/files/ExpressCardWP.pdf, [retrieved on Aug. 9, 2005].

* cited by examiner

*Primary Examiner*—Truc T Nguyen
(74) *Attorney, Agent, or Firm*—Wolf, Greenfield & Sacks, P.C.

(57) ABSTRACT

A card-type peripheral device includes an electronic component disposed in a case, and a terminal part including connection terminals connectable with a to-be-connected device, wherein a function of the electronic component and the number of terminals of the terminal part are maintained to be compatible with those of the to-be-connected device, and the outside dimensions of the case are set to be smaller than the outside dimensions of the to-be-connected device and greater than the outside dimensions of a predetermined small-size card.

3 Claims, 20 Drawing Sheets

FIG. 6

PIN ASSIGNMENTS

| Pin | Name | Usage | Input/Output |
|---|---|---|---|
| 26 | GND | GND | |
| 25 | PETp0 | PCI Express Transmitter (Host) positive | I |
| 24 | PETn0 | PCI Express Transmitter (Host) negative | I |
| 23 | GND | GND | |
| 22 | PERp0 | PCI Express Receiver (Host) positive | O |
| 21 | PERn0 | PCI Express Receiver (Host) negative | O |
| 20 | GND | GND | |
| 19 | REFCLK+ | PCI Express Reference Clock positive | I |
| 18 | REFCLK- | PCI Express Reference Clock negative | I |
| 17 | CPPE# | PCI Express Module Presence Bar | O |
| 16 | CLKREQ# | PCI Express Clock Request Bar | O |
| 15 | +3.3V | +3.3V Voltage Source | |
| 14 | +3.3V | +3.3V Voltage Source | |
| 13 | PERST# | PCI Express Reset Bar | I |
| 12 | +3.3VAUX | Undefined | |
| 11 | WAKE# | Undefined | |
| 10 | +1.5V | +1.5V Voltage Source | |
| 9 | +1.5V | +1.5V Voltage Source | |
| 8 | SMBDATA | Undefined | |
| 7 | SMBCLK | Undefined | |
| 6 | RESERVED | NC | |
| 5 | RESERVED | NC | |
| 4 | CPUSB# | Undefined | |
| 3 | USBD+ | Undefined | |
| 2 | USBD- | Undefined | |
| 1 | GND | GND | |

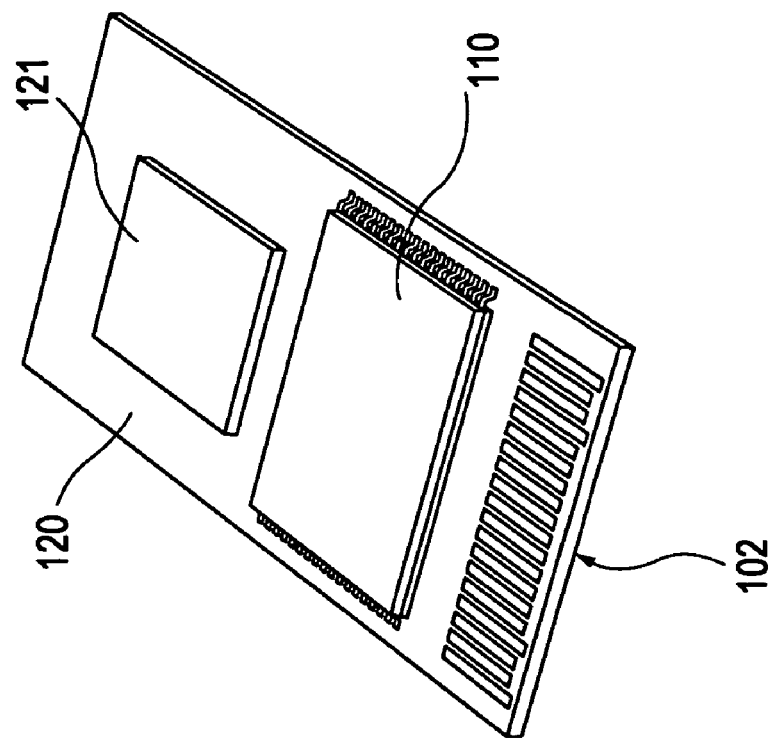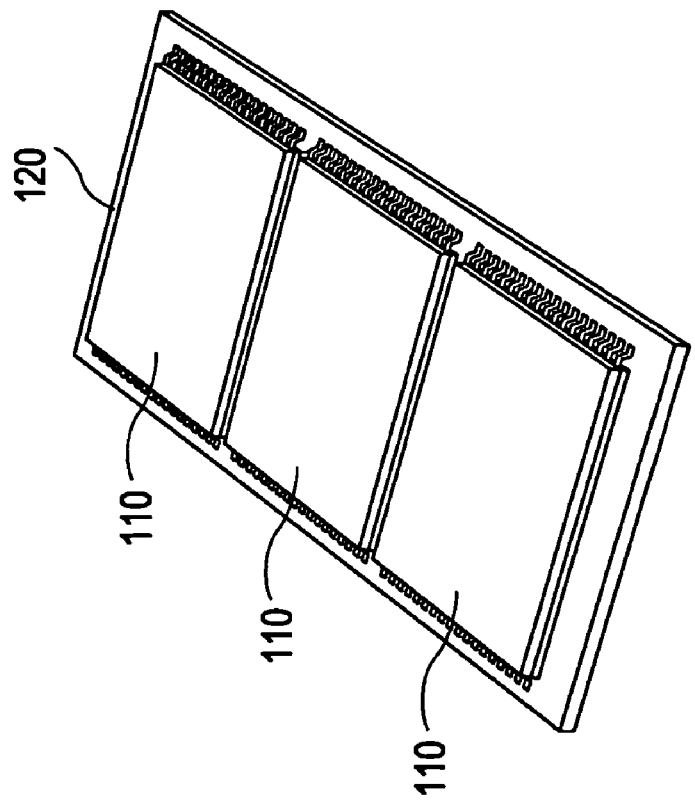

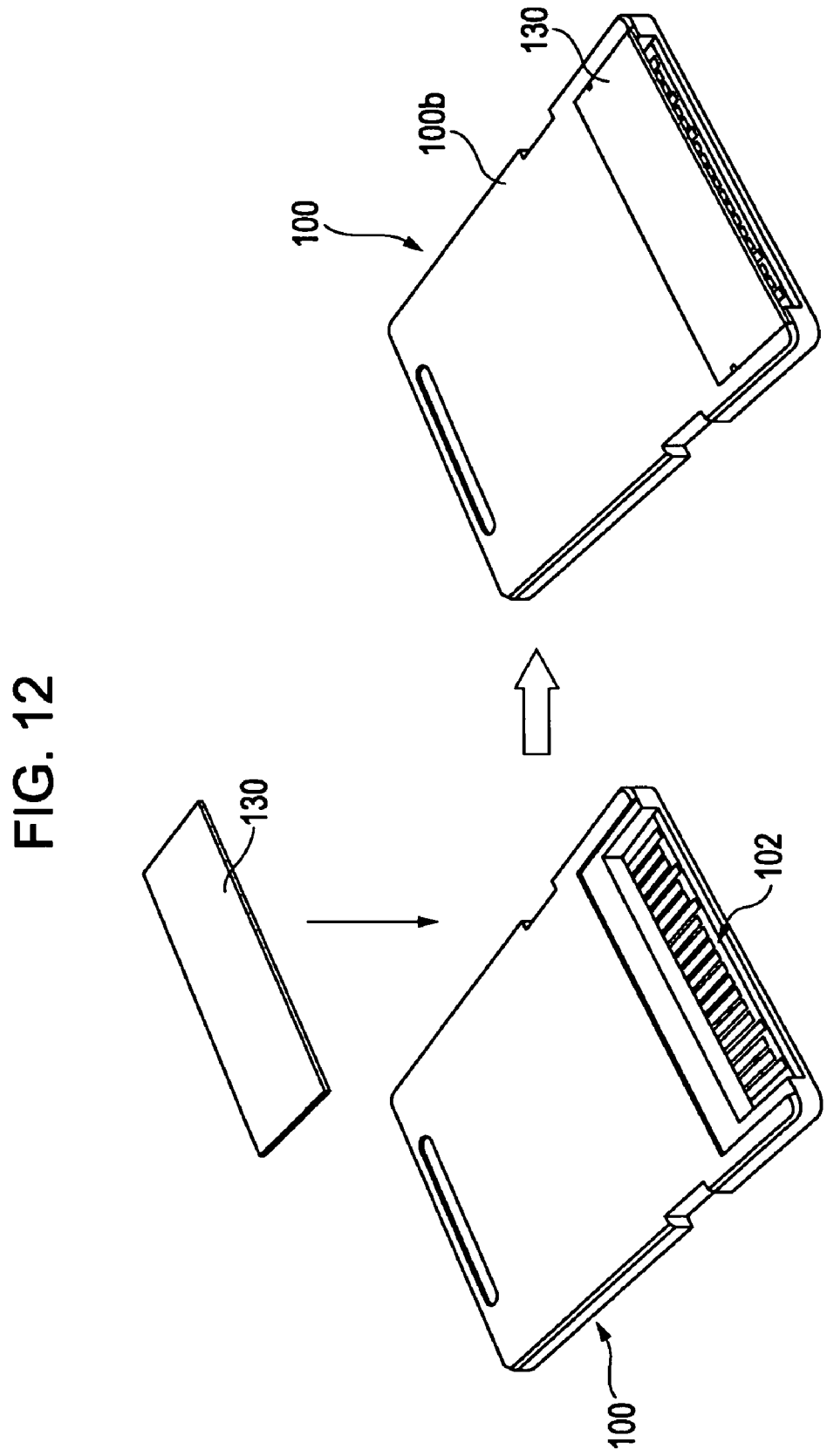

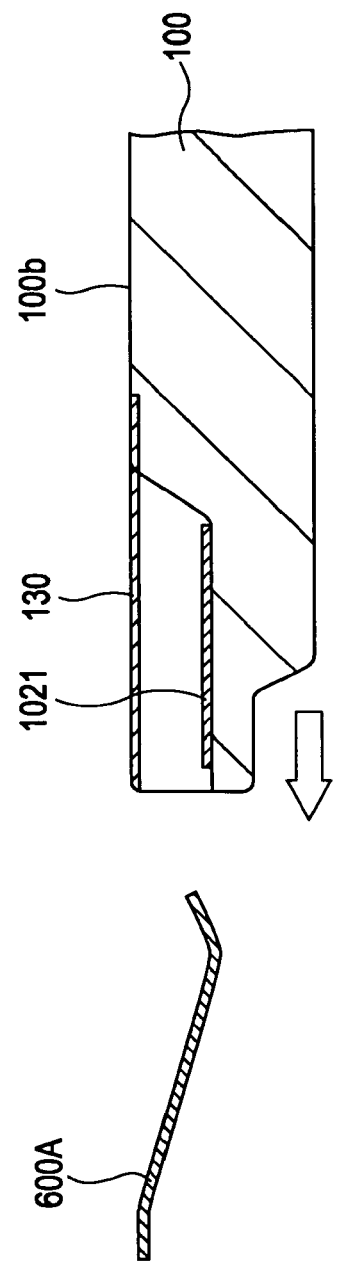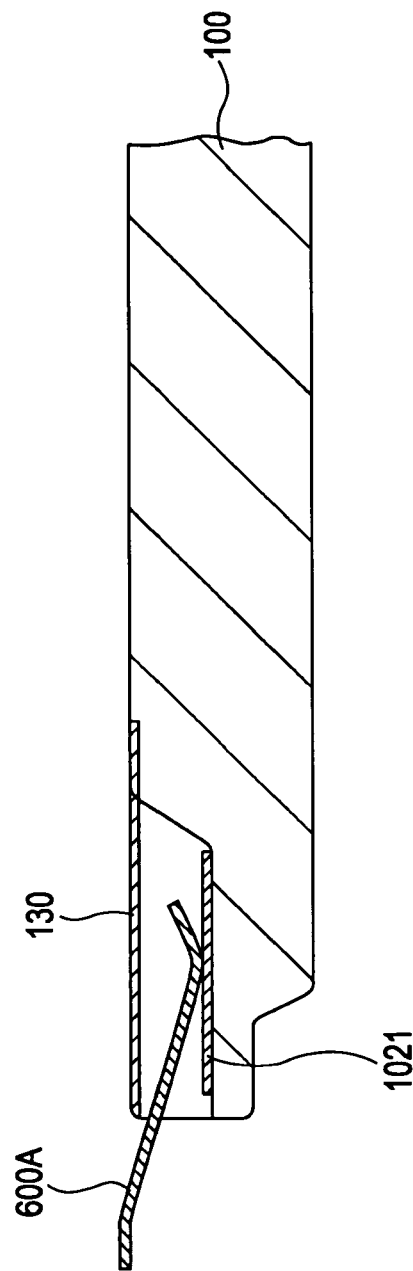

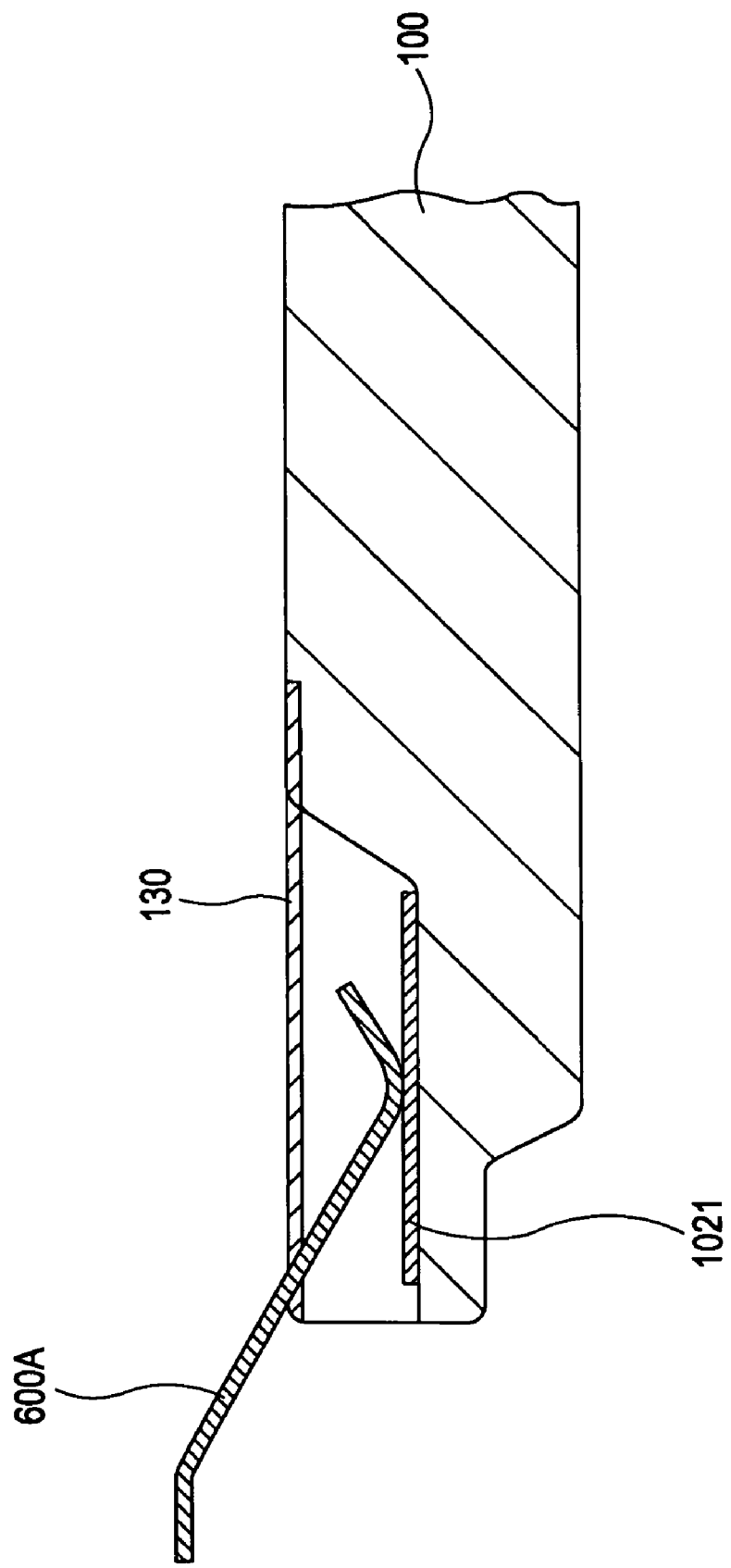

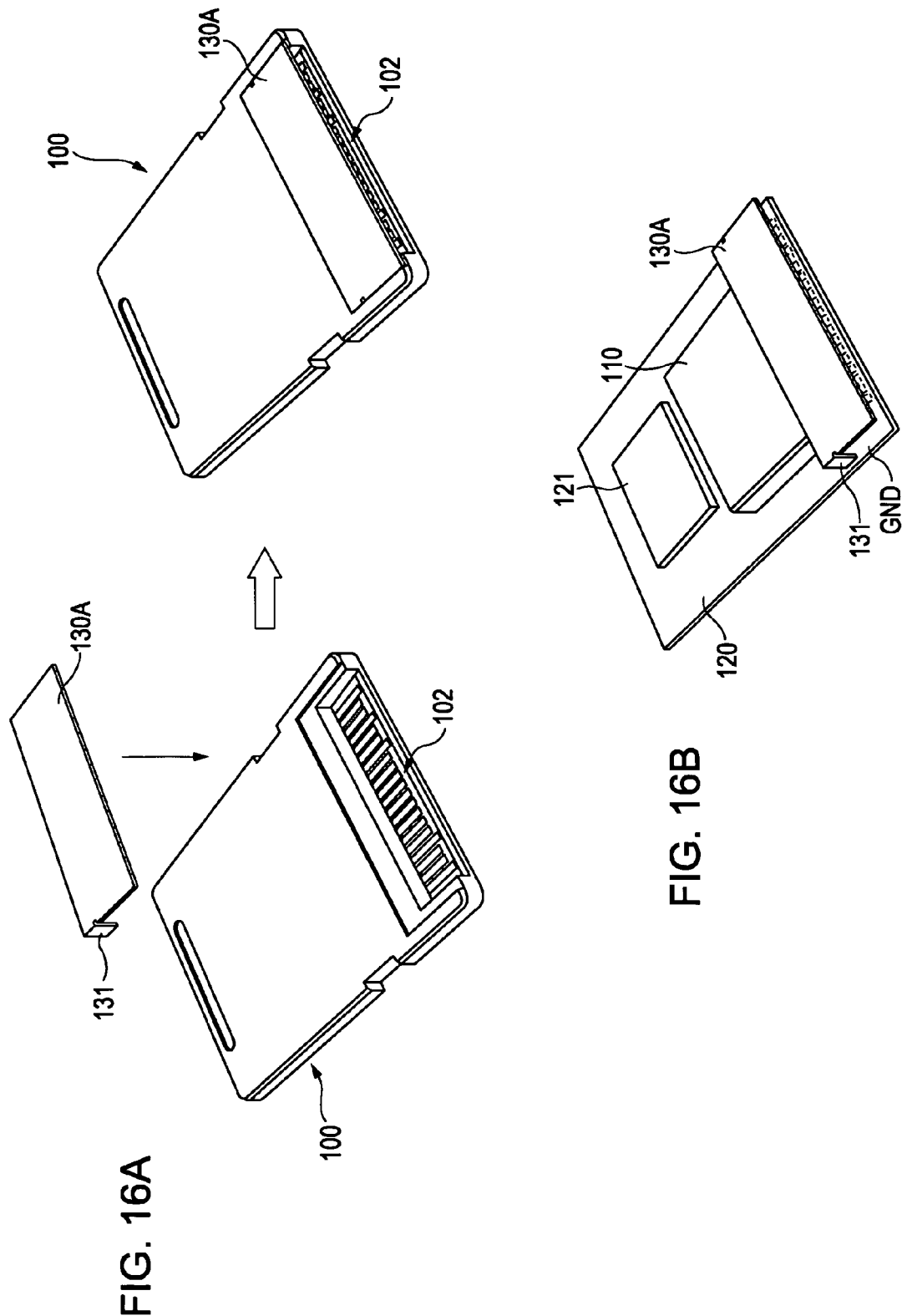

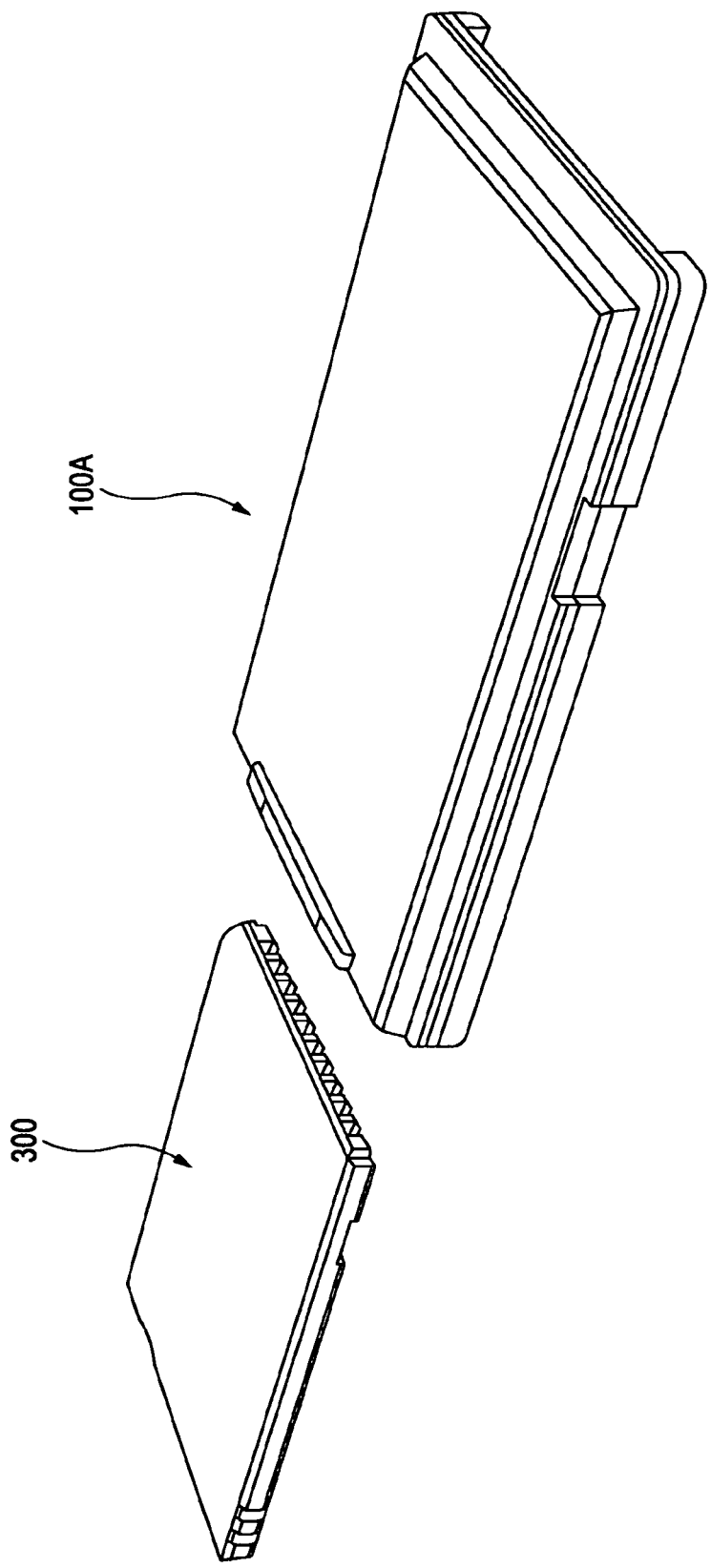

CARD-TYPE PERIPHERAL DEVICE

CROSS REFERENCES TO RELATED APPLICATIONS

The present invention contains subject matter related to Japanese Patent Application JP 2007-227206 filed in the Japanese Patent Office on Aug. 31, 2007, the entire contents of which are incorporated herein by reference.

BACKGROUND OF THE INVENTION

1. Field of the Invention

The present invention relates to a card-type peripheral device such as a memory card.

2. Description of the Related Art

In a related art, there is a card-type peripheral device called a PC card used in a state in which it is inserted in a card slot of a personal computer or the like. In recent years, a reduction in size and an increase in operating speed of personal computers have been achieved. In order to adapt to such an advance, ExpressCard (known as NEWCARD before) has been proposed as a card-type peripheral device that is smaller in outside dimensions than the PC card and that can transfer data at a high rate (see, for example, "New standard 'NEW-CARD' allows a reduction in size and an increase in operating speed of PC cards, which will lead to a further advance in personal computers" (Nikkei Electronics, Jun. 9, 2003, pp. 67-76)).

The ExpressCard is intended to be used instead of PC cards (PCMCIA) that are currently in wide use. The ExpressCard uses a PCI Express interface that is an interface according to a new I/O bus standard intended to be an alternative to a PCI bus. Compared with other cards currently used, the interface for the ExpressCard can operate at a much higher speed. Thus, when a nonvolatile memory is installed in this card so that the card functions as a memory card, the resultant memory card can write/read data at a very high rate.

Because of its high performance and usability, Express-Card is expected to be used in a wide variety of devices such as a digital camera, a portable telephone device, a PDA (Personal Digital Assistants) device, a music player, etc.

SUMMARY OF THE INVENTION

However, as shown in FIGS. 1A and 1B, this card has outside dimensions of 75 mm in length, 34 mm in width, and 5 mm in thickness, which is not small enough to be used in small-size electronic devices such as a portable telephone device, an information terminal device, a digital still camera, etc., although the dimensions are smaller than that of the PC card currently used. That is, the not-small-enough dimensions of the ExpressCard are disadvantageous when the card is installed in a small-size electronic device. Thus, there is a need for a new card-type peripheral device that is smaller in outside dimensions than the ExpressCard and that can be installed in an ExpressCard slot.

Memory cards with a still smaller size are available for use in electronic devices such as portable telephone devices, information terminal devices, digital still cameras, etc. Such small-size memory cards are usable not only in small-size electronic devices but also usable in rather-large-size external devices such as personal computers (PCs) having a slot for receiving the small-size memory card. However, at present, it is difficult to use small-size memory cards in devices originally designed for use with standard ExpressCard. In view of the above, there is a need for a new card-type peripheral device having an adapter function that allows a small-size memory card to be used in a device originally designed for use with ExpressCard.

Currently available small-size memory cards generally have 10 or more terminals disposed on one surface thereof. However, most cards do not have partitions. Even in a case where there are partitions, they are very small and they do not function to protect terminals. As shown in FIGS. 2A and 2B, a terminal surface part 2 of card 1 is not protected from the outside, and thus a person can easily touch the terminal surface part 2. Therefore, the terminal surface can be contaminated, and the contamination can cause a problem such as a failure to read a signal when the card 1 is used.

As shown in FIGS. 3A and 3B, some cards 1A have partitions formed on both sides of a terminal part 2A thereby protecting the terminal surface from being touched with a hand of a person.

However, if the number of terminals of the memory card is increased to meet a need for a higher operating speed or the like, the result is a reduction in the terminal-to-terminal distance. In this case, there is a possibility that no space for forming partitions can be found. Even in a case where partitions can be formed, partitions with a small width are expected to have difficulty in providing a sufficiently high mechanical strength.

In view of the above, the present invention provides a card-type peripheral device that has a small size and that makes it possible to use a small-size card in a device with a large slot, and that has a capability of effectively protecting a terminal surface.

According to an embodiment of the present invention, there is provided a card-type peripheral device including an electronic component disposed in a case, and a terminal part including connection terminals connectable with a to-be-connected device, a function of the electronic component and the number of terminals of the terminal part are maintained to be compatible with those of the to-be-connected device, and the outside dimensions of the case are set to be smaller than the outside dimensions of the to-be-connected device and greater than the outside dimensions of a predetermined small-size card.

The outside dimensions of the case may be smaller than those of a standard PCI Express card medium.

The outside dimensions of the case may be smaller than the outside dimensions of a standard PCI Express card medium and greater than the outside dimensions of a memory stick Duo (registered trademark) or an SD (registered trademark) card used as the predetermined small-size card.

The electronic component may include a nonvolatile memory and may function as a memory card capable of writing and reading data via an interface.

The card-type peripheral device may further include a slot via which the small-size card is allowed to be inserted and pulled out, a receiving part formed in the case and adapted to receive the small-size card therein, and a connector connectable with the terminal part of the small-size card received in the receiving part, wherein the electronic component may function as a card adapter including an interface conversion circuit connected to the connector and the terminal part.

The terminal part may be formed so as to be exposed via a part of the case, and a terminal cover receiving part may be formed in the case, the terminal cover receiving part being capable of fitting with a terminal cover configured to cover the exposed portion of the terminal part while maintaining an opening that allows a connector of the to-be-connected device to enter therethrough.

The terminal cover may be formed of an electrically conductive material, and the terminal cover may have a contact part connectable with a common terminal in the case in a state in which the terminal cover is disposed on the terminal cover receiving part.

The common terminal may be formed on a circuit board.

As described above, the present invention provides the advantage that it is possible to realize the small-size card-type peripheral device that makes it possible to use a small-size card in a device having a large slot and that has the capability of effectively protecting the terminal surface.

BRIEF DESCRIPTION OF THE DRAWINGS

FIG. 4A is a perspective view of the card-type peripheral device viewed from a first surface side thereof, while FIG. 4B is a perspective view of the card-type peripheral device viewed from a second surface side thereof;

FIG. 6 is a table showing pin assignments according to the ExpressCard standard;

FIGS. 7A to 7D are diagrams showing an example of an adapter that makes it possible to use a small-size card in a state in which the small-size card is inserted in an ExpressCard slot disposed in a PC or the like;

FIGS. 10A and 10B are diagrams provided for an explanation of a manner of arranging memory chips and determining the length of a card-type peripheral device depending on the arrangement of memory chips;

FIG. 12 is a diagram illustrating an example of a card-type peripheral device having a terminal cover;

FIGS. 13A and 13B are diagrams illustrating an example of a manner in which a contact pin of a connector is brought into contact with a terminal part of a card-type peripheral device having a terminal cover;

FIG. 15 is a diagram provided for an explanation of a possibility that an unacceptable connector is designed because of the existence of a terminal cover;

FIGS. 16A and 16B are diagrams illustrating an example of a configuration of a card-type peripheral device having a terminal cover;

FIG. 17 is a perspective view illustrating an outward appearance of a card-type peripheral device configured so as to function as an adapter according to an embodiment of the present invention;

DESCRIPTION OF THE PREFERRED EMBODIMENTS

Embodiments of the present invention are described below with reference to the accompanying drawings.

Figure 1A:
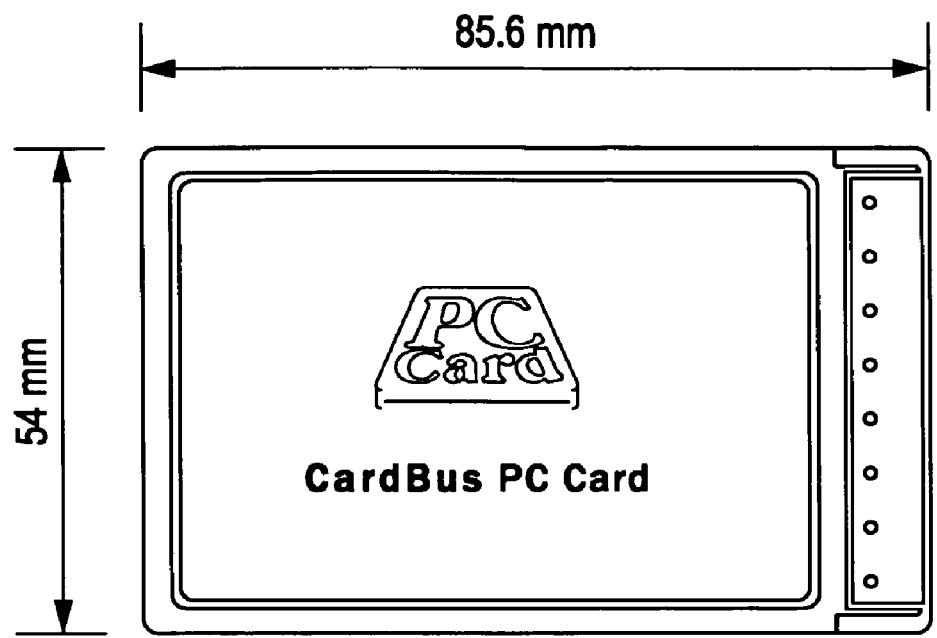
FIGS. 1A and 1B are diagrams provided for an explanation of outside dimensions of a card according to an ExpressCard standard.
Figure 1B:
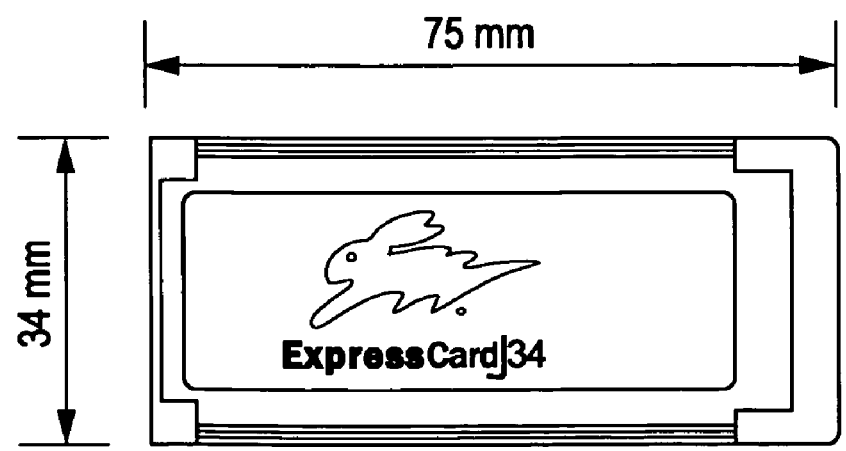
Figure 2B:
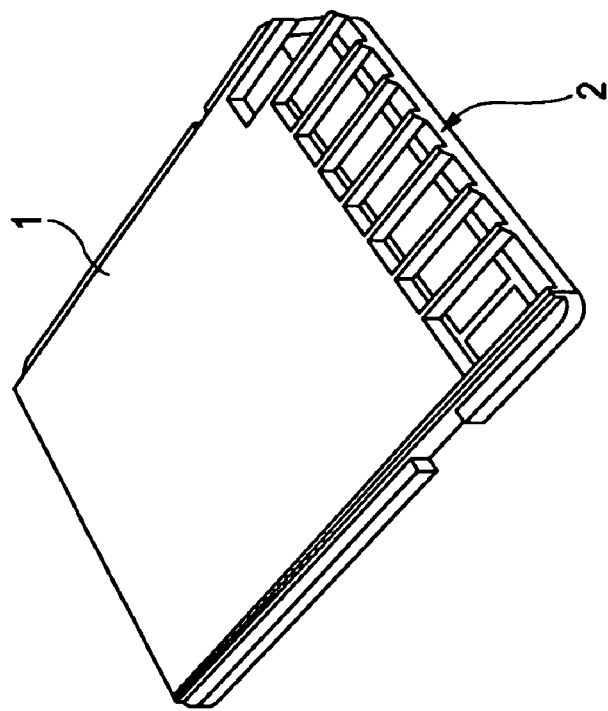
FIGS. 2A and 2B are diagrams illustrating examples of cards whose terminal surface is not protected from the outside.
Figure 2A:
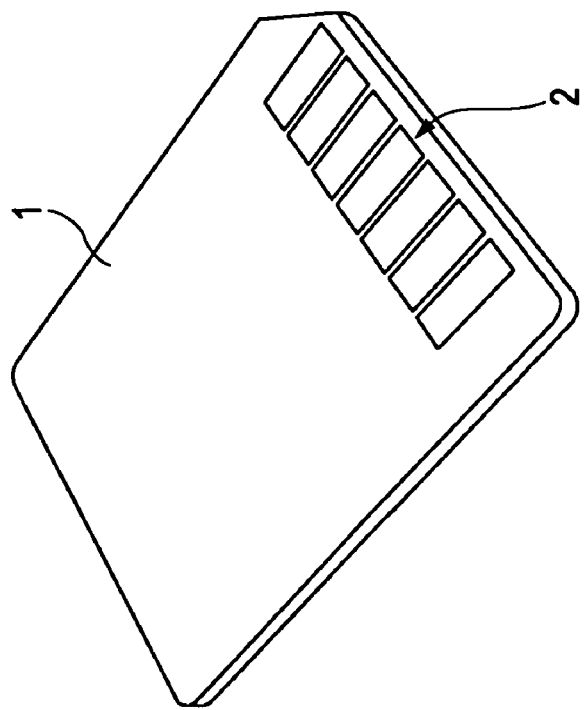
Figure 3B:
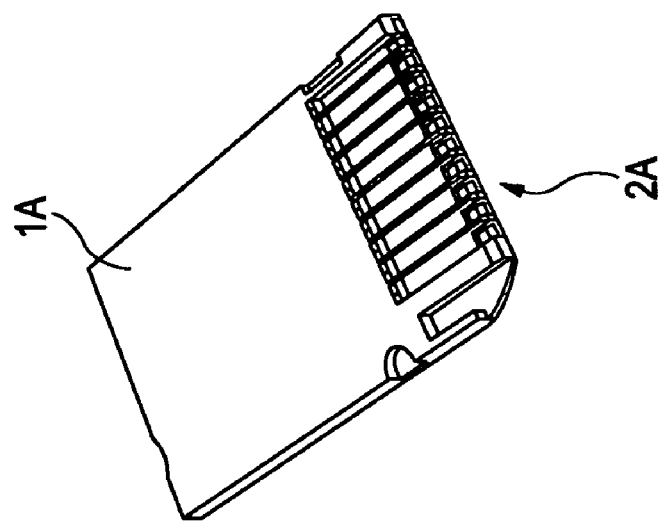
FIGS. 3A and 3B are diagrams illustrating examples of cards having partitions for protecting terminals.
Figure 3A:
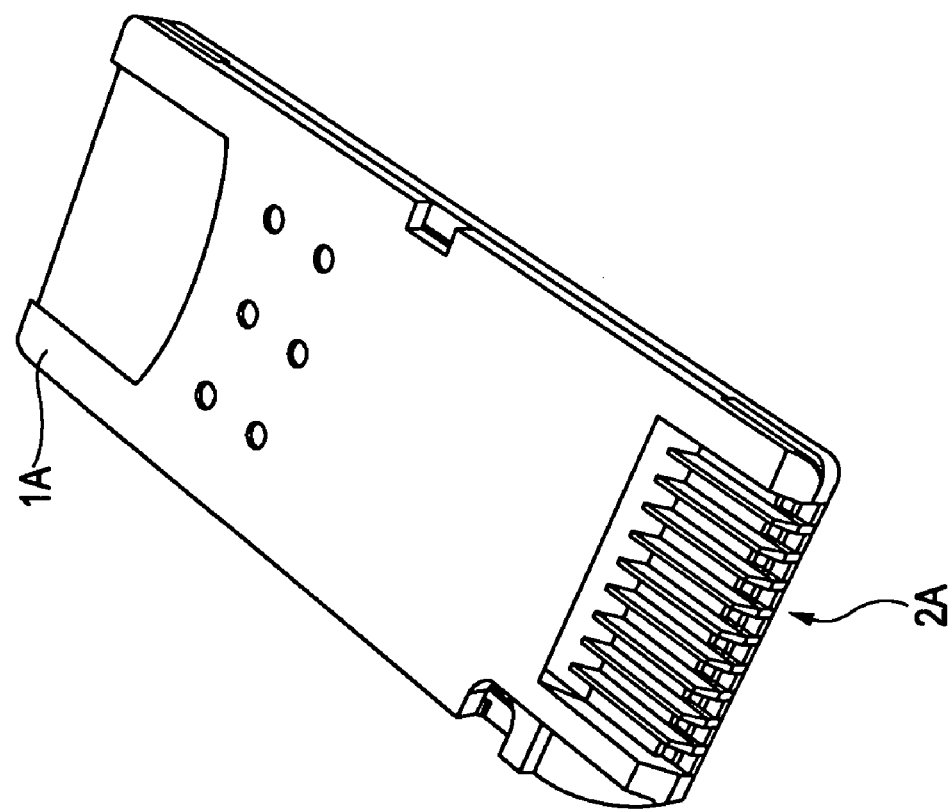
Figure 4B:
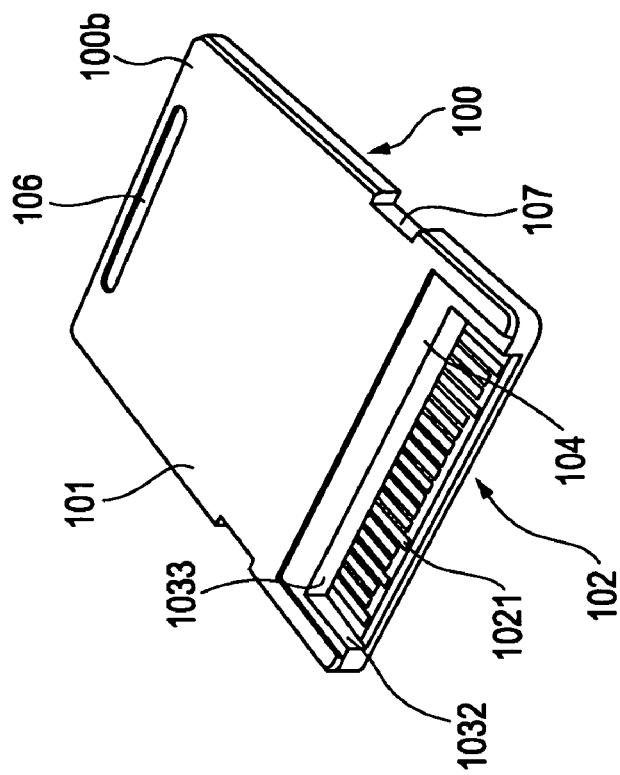
FIGS. 4A and 4B are perspective views of a card-type peripheral device functioning as a memory card according to an embodiment of the present invention, and more particularly.
Figure 4A:
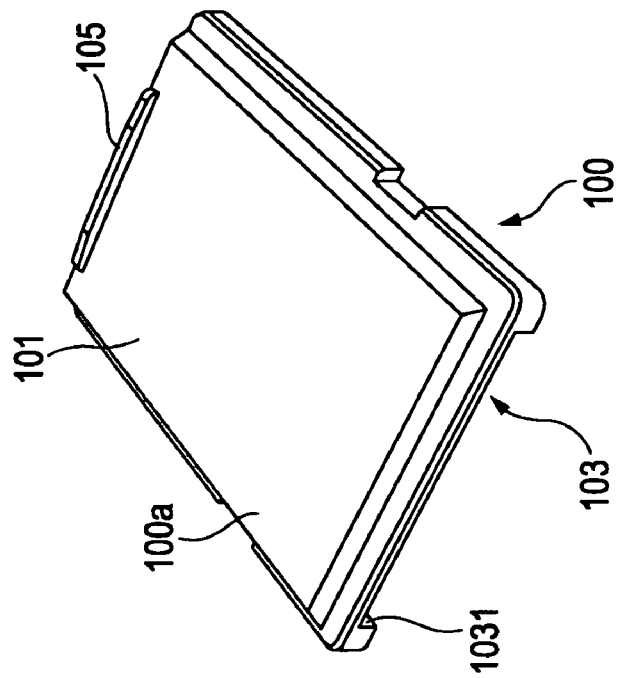

FIGS. 4A and 4B are perspective views illustrating an outward appearance of a card-type peripheral device according to an embodiment of the present invention, and more specifically, FIG. 4A is a perspective view of the card-type peripheral device viewed from a side of a first surface thereof, while FIG. 4B is a perspective view of the card-type peripheral device viewed from a side of a second surface thereof.

First, an overview is given of a characteristic configuration and functions of the card-type peripheral device (a memory card and an adapter) 100 according to the present embodiment.

The card-type peripheral device 100 according to the present embodiment is implemented in the form of a PC card medium that directly uses PCI Express or USB as an interface, and that includes a nonvolatile memory disposed therein whereby the PC card medium functions as a memory card adapted to store/read data via the interface. The card-type peripheral device 100 is configured so as to serve as a small-size high-capacity memory card usable as a removable storage medium for a high-performance mobile device such as a video camera, a digital still camera, etc. To this end, the memory card has functions and the number of pins compatible with those for the above-described use. The card-type peripheral device 100 is configured to be smaller in outside dimensions than a standard PCI ExpressCard medium so that the card-type peripheral device can be used in a small-sized device. The card-type peripheral device 100 is configured to be greater in outside dimensions than commercially available small-size memory cards (such as a memory stick (registered trademark) or an SD card (registered trademark)). That is, the card-type peripheral device 100 has a size that allows this card-type peripheral device 100 to function as a card adapter for using a commercially available small-size memory card (such as a memory stick (registered trademark) or an SD (registered trademark) card) in a device having a standard ExpressCard slot.

The card-type peripheral device 100 has a cover whereby terminals, which are formed on the card to transmit/receive a signal to/from the host device, are protected from being directly touched with a hand of a person who uses the card-type peripheral device 100. The card-type peripheral device 100 has a terminal cover made of an electrically conductive material, which is disposed on a memory card such that the terminal cover is connected to a ground terminal in the card thereby to prevent static electricity from being applied to a signal terminal and thus prevent a controller or a nonvolatile memory (flash memory) in the memory card from being destroyed by the static electricity.

Further referring to FIGS. 4A and 4B, the outer configuration of the card-type peripheral device 100 is described more specifically below. The card-type peripheral device 100 shown in FIGS. 4A and 4B is adapted to function, for example, as a memory card (hereinafter the card-type peripheryal device 100 may also be called the memory card 100).

In the card-type peripheral device 100, a card case 101 is formed between a first surface 100a and a second surface 100b opposing to the first surface 100a. The card case 101 has a form of a box located on the first surface 100a.

A terminal part 102 including terminals 1021 arranged in a line is formed in a front end portion of the second surface 100b. The terminal part 102 allows the memory card 100 to receive electric power and transmit/receive data via contact pins of a connector disposed on the host device (not shown). Note that in FIGS. 4A and 4B, the memory card 100 is in a basic state in which a terminal cover is not placed on the terminal part 102.

The front end portion of the second surface 100b is recessed toward the first surface 100a so as form a recess 103, and the terminal part 102 is located on the bottom of this recess 103 such that the terminal part 102 is exposed to the outside via the recess 103. The recess 103 is surrounded by side walls 1031 and 1032 that are formed on respective sides of the terminal part 102 and by a side wall 1033 that is formed at a rear end of the terminal part 102 such that the side walls 1031, 1032, and 1033 function as partition walls. Furthermore, on the second surface 100b, a terminal cover receiving part 104 is formed such that a terminal cover described later is allowed to be fitted therein. The terminal cover receiving part 104 is configured in the shape of a step recessed from the second surface 100b into the inside of the card to a depth substantially equal to the thickness of the terminal cover such that the terminal cover in the form of a thin plate can be fitted in the terminal cover receiving part 104 in such a manner that one surface of the terminal cover is flush with the second surface 100b.

In a rear end part of the card-type peripheral device 100, a grip 105 used to hold the card is formed on the first surface 100a, notches 106 and 107 usable for the same purpose as the grip 105 are formed on the second surface 100b or on a side face.

The outside dimensions of the card-type peripheral device 100 according to the present embodiment are discussed below. That is, in the present embodiment, the outside dimensions of the card-type peripheral device 100 are set such that the width falls within the range from 20 mm to 34 mm, the length from 31 mm to 75 mm, and the thickness from 1.6 mm to 5 mm, for the following reason.

Figure 5C:
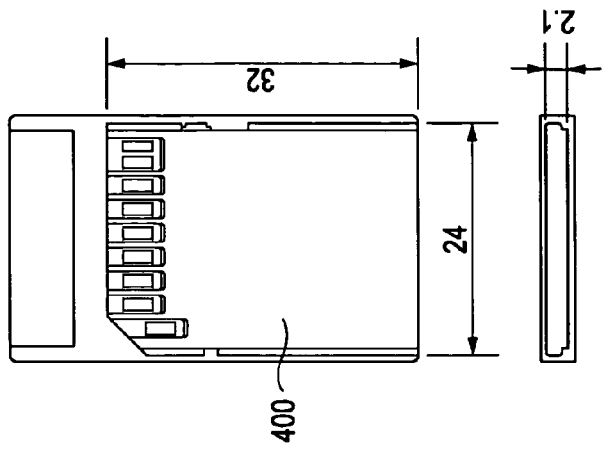
FIGS. 5A to 5C are diagrams provided for an explanation of dimensions of various types of cards.
Figure 5B:
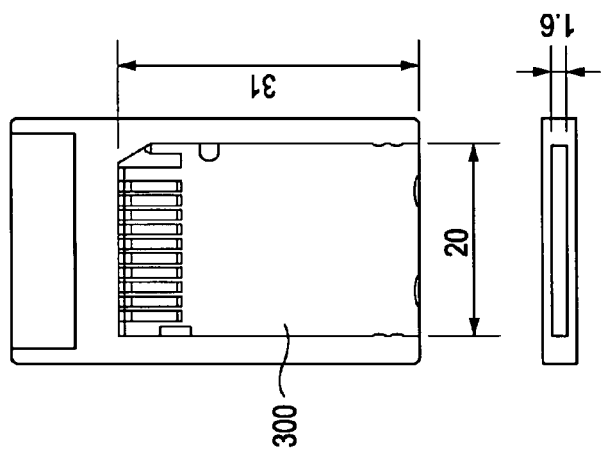
Figure 5A:
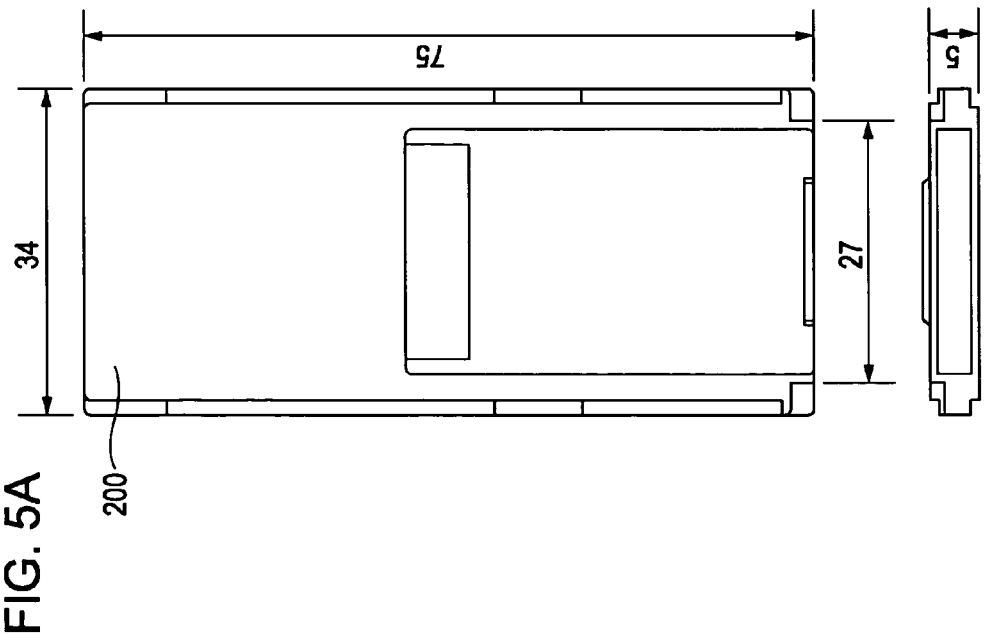

As shown in FIG. 5A, the size of the ExpressCard 200 is defined such that the length is 75 mm, the width is 34 mm, and the thickness is 5 mm.

On the other hand, for example, the memory stick (MS) Duo (registered trademark) 300 widely used as a small-size memory card has the following size: 31 mm in length; 20 mm in width; and 1.6 mm in thickness, as shown in FIG. 5B. On the other hand, the SD (registered trademark) card 400, which is another type of memory card, has the following size: 32 mm in length; 24 mm in width; and 2.1 mm in thickness. As described above, the memory card 100 according to the present embodiment has the interface according to the ExpressCard standard.

FIG. 6 shows pin assignments according to the ExpressCard standard.

The ExpressCard standard specifies that a card has 26 terminals in total, as shown in FIG. 6. In the memory card 100 serving as the small-sized peripheral device according to the present embodiment, to achieve a reduction in size, terminals are eliminated that are not used when the ExpressCard is used as a memory card. For examples, pins 5 and 6 are reserved, and there are no functions currently assigned to these pins. Thus the pins 5 and 6 can be eliminated. Furthermore, pins 7 and 8 and pins 11 and 12 are not necessary for use as the memory card, and thus they can be eliminated. Pins 1, 2, 3, and 4 are not for the Express interface but for the USB interface, and these pins are not necessary when the card is used as a usual memory card. These pins may remain for complementary use, for example, in a legacy card adapter or the like. In view of the above, the total of 26 pins can be reduced to 16 to 20 pins.

Figure 7A:
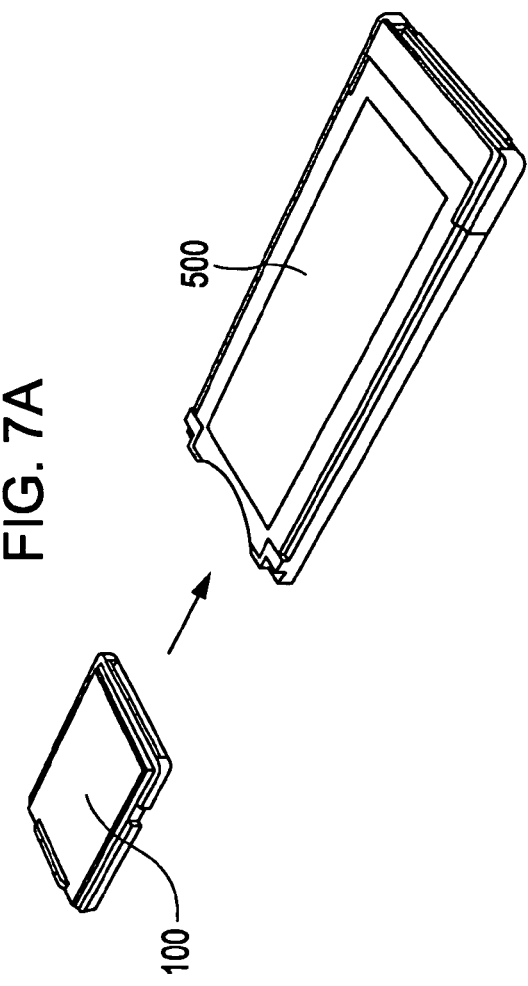
Figure 7D:
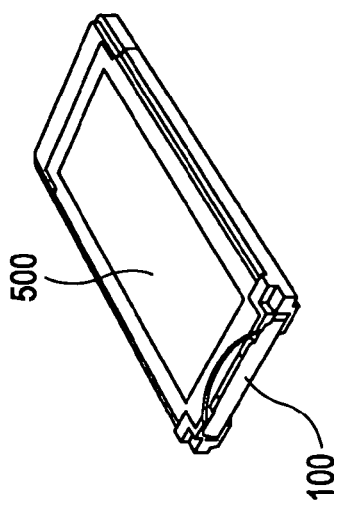
Figure 7C:
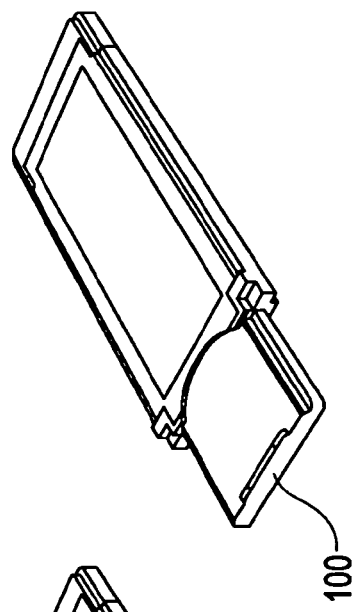
Figure 7B:
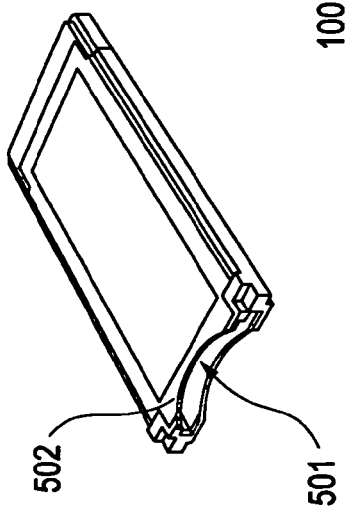

FIGS. 7A and 7D illustrate an example of an adapter for making it possible for the small-size card described above to be used in a state in which the small-size card is inserted in an ExpressCard slot installed in a PC or the like. The adapter 500 is formed so as to have a shape similar to that of the standard ExpressCard except that a slot 501 for receiving the small-size card is formed in the rear end part, and a cutout 502 is also formed therein to ease accessing to the grip or the notch formed on the card-type peripheral device 100 when the inserted card is pulled out.

Figure 8:
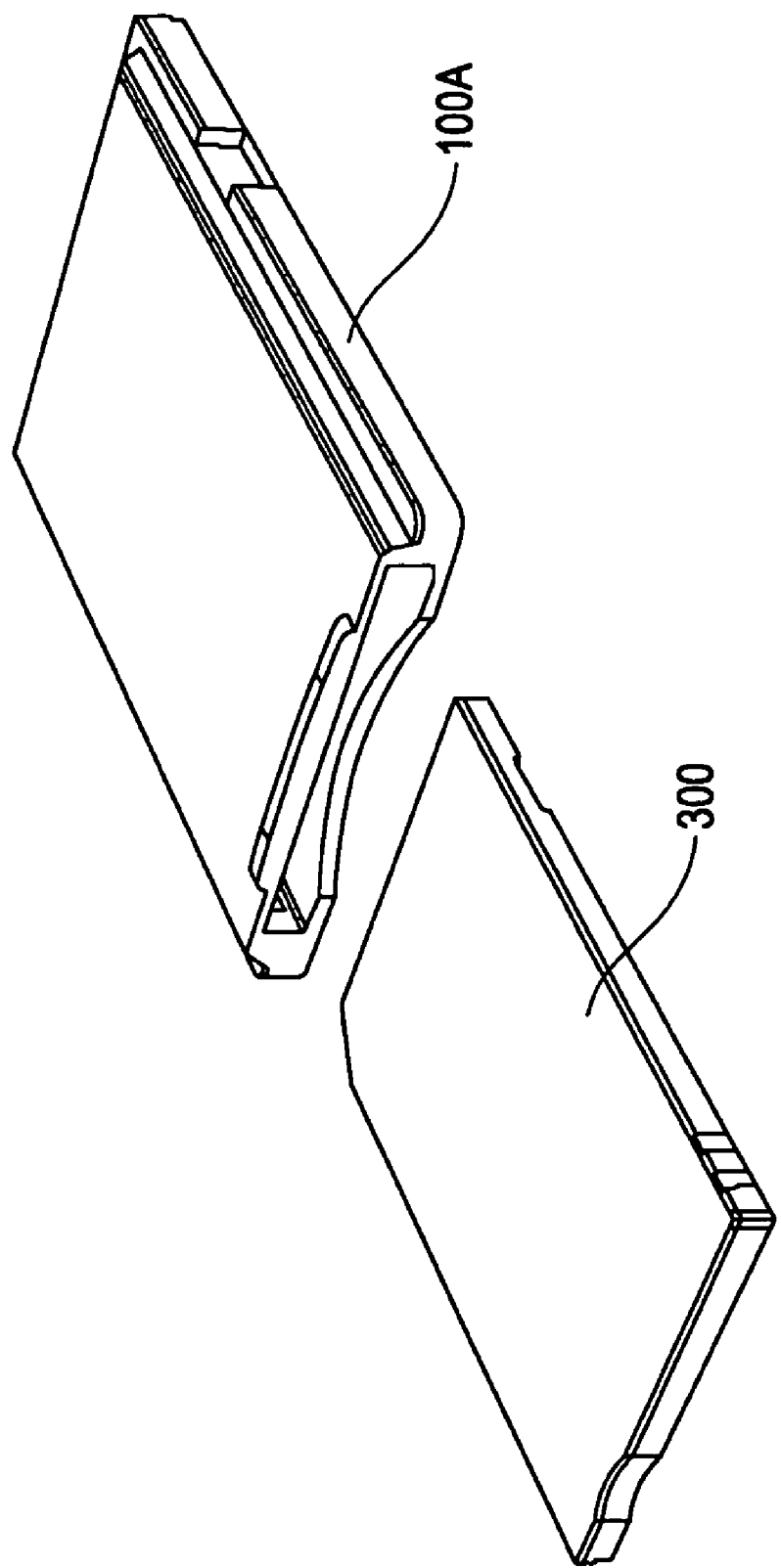
FIG. 8 is a diagram illustrating an example of a card-type peripheral device configured so as to function as a small-size memory card and as a card adapter that makes it possible to use the small-size memory card in a small-size card slot, according to an embodiment of the present invention.

FIG. 8 illustrates an example of a card-type peripheral device according to the present embodiment configured to function as a card adapter for using a memory stick Duo (registered trademark), which is a small-size memory card, in a small-size card slot. As described above, the card-type peripheral device 100 according to the present embodiment is usable also as a card adapter 110A for use with a small-size card. The internal structure of this card adapter will be described later. To use the adapter for the above purpose, the size of the card-type peripheral device according to the present embodiment should be greater than the size of the memory stick Duo (registered trademark) 300 and smaller than the size of the ExpressCard. That is, as described above, the width should be in the range from 20 mm to 34 mm, the length from 31 mm to 75 mm, and thickness from 1.6 mm to 5 mm.

Figure 9:
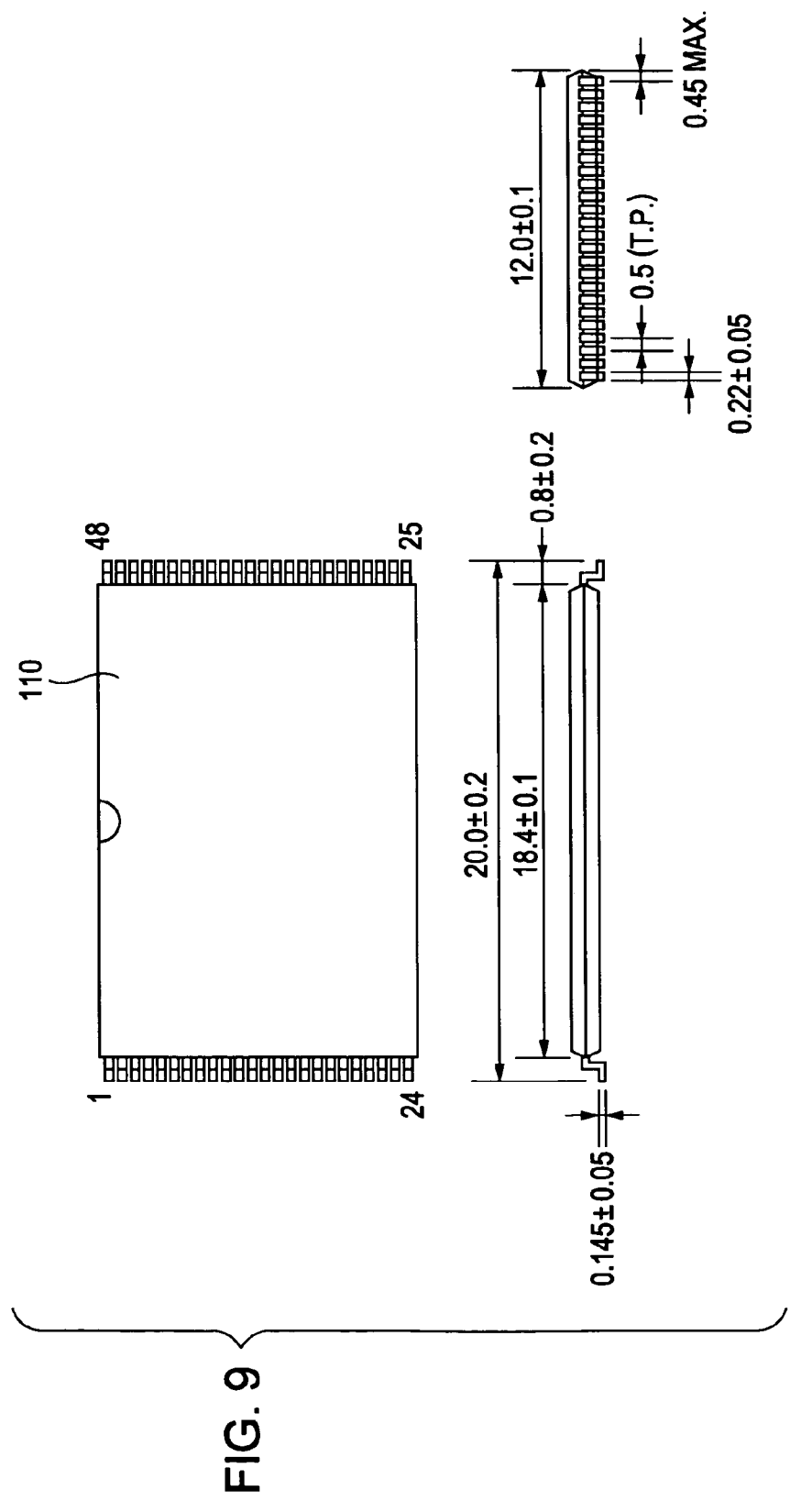
FIG. 9 is a diagram provided for an explanation of a size of a flash memory.

Practically, the sizes of parts of both adapters and the sizes of terminals disposed on each adapter should also be taken into account. Furthermore, when the card-type peripheral device 100 is used as a memory card, the size of each flash memory chip disposed in the card should be taken into account. In this regard, as shown in FIG. 9, the width of the flash memory chip 110 is about 20 mm for widely used TSOP (48) and 18 mm or less for LGA. Thus, to accommodate a circuit board on which the flash memory chip 110 is disposed and to accommodate 20 terminals, it is desirable that the width be set in the range from 21 mm to 28 mm. On the other hand, the memory chip has a thickness of 1.2 mm at most. If it is assumed that the circuit board has a thickness of 0.6 mm, and if it is assumed that memory chips are allowed to be mounted on only one side or on both sides of the circuit board, the thickness of the card-type peripheral device used as the adapter is set in the range from 2.5 mm to 4.0 mm. Furthermore, to dispose 3 memory chips each having a width of 12 mm to 14 mm on the circuit board in a direction along the length of the card-type peripheral device as shown in FIG. 10A, the length of the card-type peripheral device is set in the range from 42 mm to 50 mm.

In the card-type peripheral device 100 having the outside dimensions selected in the above-described manner, the terminal part 10 is in an exposed form, as described above. In this configuration, the terminals can be touched directly by a hand of a person who uses the card-type peripheral device 100.

Figure 11:
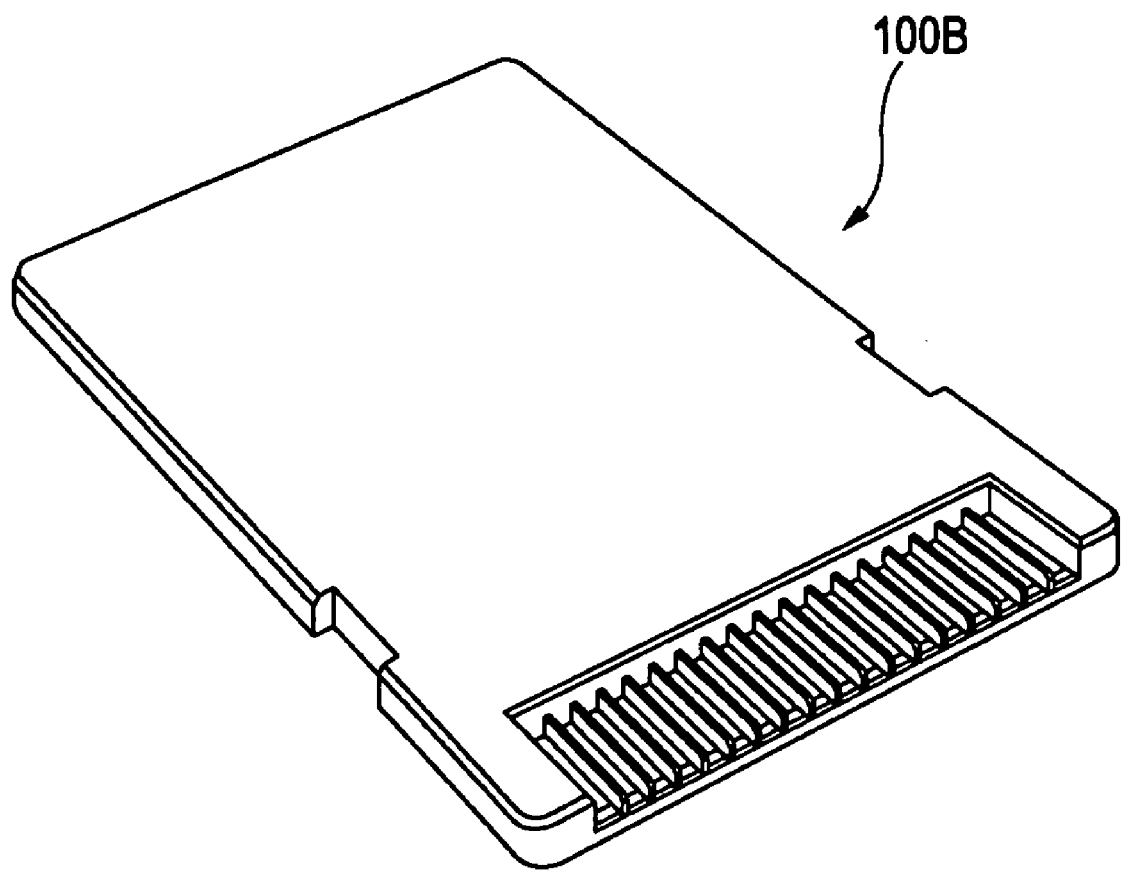
FIG. 11 is a diagram illustrating an example of a card-type peripheral device configured to have partitions in a terminal part.
Figure 14A:
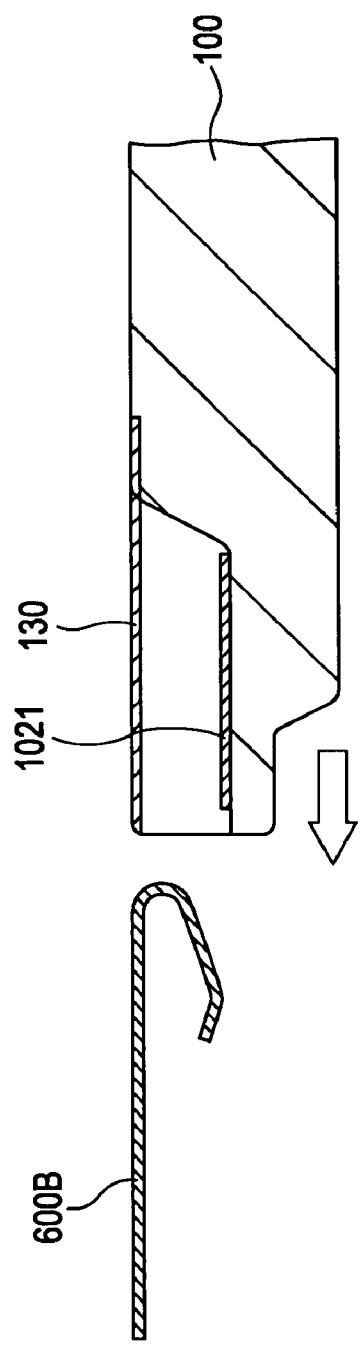
FIGS. 14A and 14B are diagrams illustrating an example of a manner in which a contact pin of a connector is brought into contact with a terminal part of a card-type peripheral device having a terminal cover.
Figure 14B:
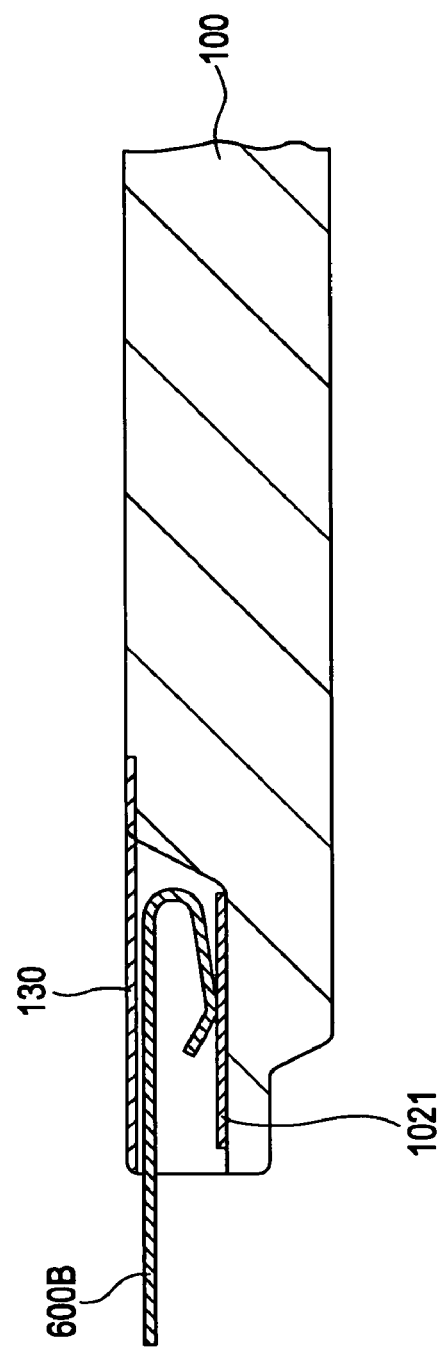

FIG. 11 illustrates an example of a configuration having partitions. When there are a large number of terminals, it is difficult to form the partitions so as to have a sufficiently large size, which can cause a problem that a sufficiently high mechanical strength is not obtained. As specifications of the card, the above-described configuration is allowed in which the terminals are exposed to the outside. However, this configuration has the disadvantage that there is a possibility that the terminal surface is contaminated with a foreign substance, which can cause a failure in connection with a contact pin of a connector when the card is inserted in the host device. Thus, there is a possibility that the card does not operate correctly. There is also a possibility that static electricity is applied to a signal terminal of the card from a human hand or clothes. This can cause a controller or a flash chip disposed in the card to be destroyed.

In the present embodiment, to prevent the above problem, the card-type peripheral device is configured such that a terminal cover 130 can be attached to the card-type peripheral device so as to cover the terminals, as shown in FIG. 12. The terminal cover 130 is fitted in a terminal cover receiving part 104 formed in a front end part of the second surface 100b of the card-type peripheral device 100. In a state in which the terminal cover 130 formed in the shape of a thin plate is fitted in the terminal cover receiving part 104, one surface of the terminal cover is flush with the second surface 100b, and thus a flat surface having no step is formed. In this state, the terminal part 102 is covered with the terminal cover 130 on the side of the second surface 100b, and the terminal part 102 is open only at a front end face thereof. The opening at the front end face allows contact pins of a connector to be inserted or pulled out therethrough. That is, the terminal cover 130 is fitted in the terminal cover receiving part 104 such that the opening remains without being closed thereby allowing the connector to enter the terminal part.

As shown in FIGS. 13A and 13B and FIGS. 14A and 14B, contact pins 600A or 600b of the connector (not shown) are disposed in the connector such that they elastically receive the card-type peripheral device 100, while the card terminals 1021 of the terminal part 102 of the card-type peripheral device 100 are located substantially in the middle of the total thickness of the card. The difference between FIG. 13 and FIG. 14 is in the shape of the contact pins 600A or 600B of the connector. The contact pins 600A or 600B of the connector can be easily designed such that they are wholly located at a position higher than the second surface 100b, i.e., the lower surface, of the card-type peripheral device 100. However, if it is not presented beforehand that there can be the terminal cover 130, there is a possibility that the connector is designed into a form that is not connectable with the card-type peripheral device 100, as is the case in an example shown in FIG. 15. To avoid this potential problem, it should be assumed that there is a terminal cover regardless of whether the terminal cover actually exists or not.

FIGS. 16A and 16B illustrate an example of a structure of a card-type peripheral device having a terminal cover. In this example, a terminal cover 130A is formed of an electrically conductive material (such as aluminum, SUS, etc.) such that a contact part 131 is formed on a side at one end in a longitudinal direction. When the terminal cover 130A is in a state where it is fitted in the terminal cover receiving part 104, the contact part 131 is in contact with a common terminal serving as a ground terminal via the circuit board 120 in the card. This can prevent static electricity from being applied directly to a signal terminal, but static electricity is shunted to the common terminal thereby allowing the card to have high resistance against static electricity.

The embodiments of the present invention have been described above, assuming that the card-type peripheral device is used as a memory card. The card-type peripheral device may be implemented so as to function as a card adapter according to an embodiment of the invention, as described below.

FIG. 17 is a perspective view illustrating the outward appearing of a card-type peripheral device configured so as to function as a card adapter according to an embodiment of the present invention. This card adapter 100A has an outward appearance and outside dimensions similar to those of the previous embodiments. That is, the size (the outside dimensions) of the card adapter 100A is greater than that of the memory stick Duo (registered trademark) 300 and smaller than that of the ExpressCard. In the example shown in FIG. 17, the card-type peripheral device is configured so as to function as the card adapter that allows the memory stick Duo (registered trademark), which is a small-size memory card, to be used in a small-size card slot.

Figure 18:
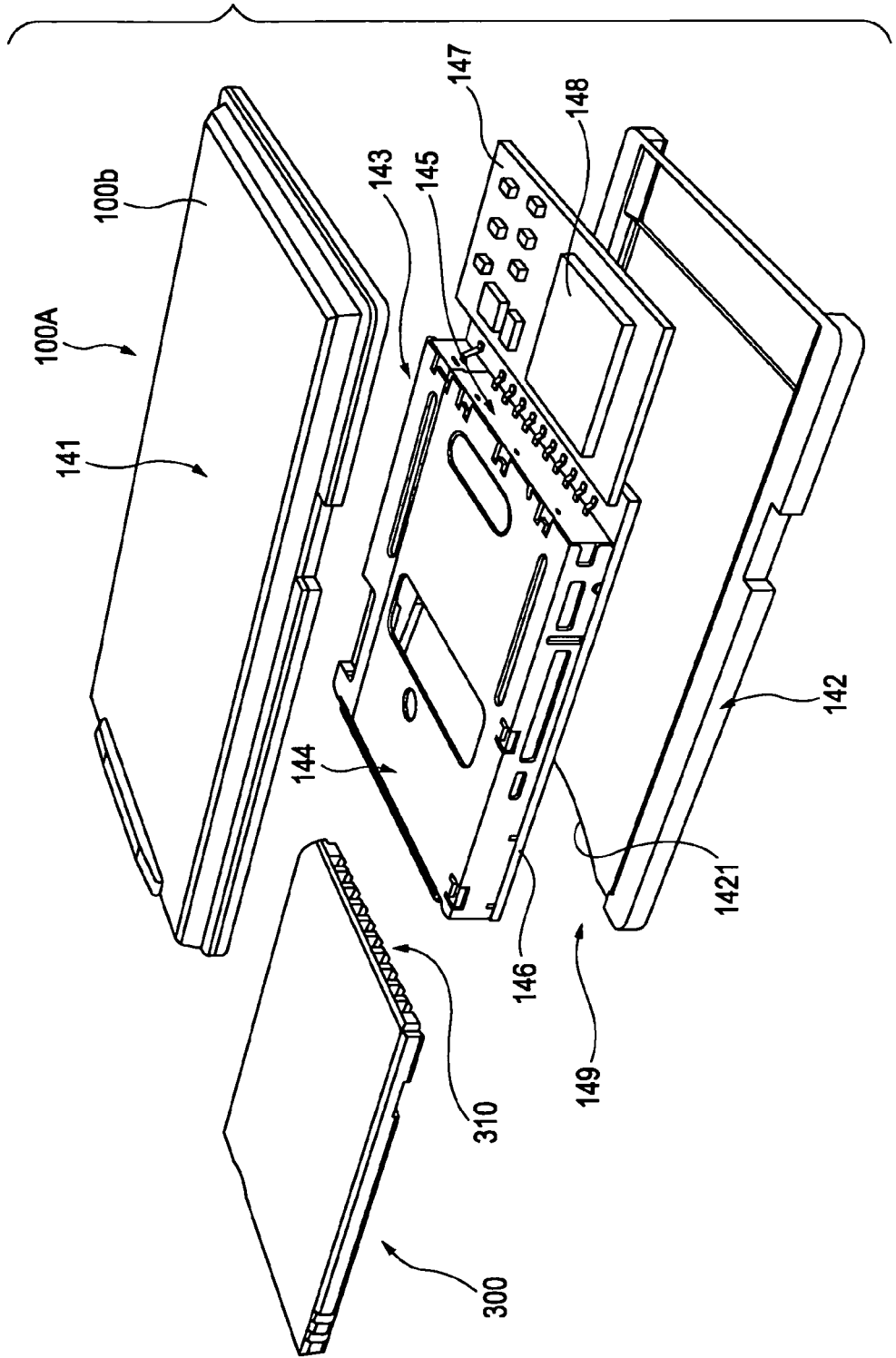
FIG. 18 is an exploded perspective view illustrating main parts of a card-type peripheral device functioning as a card adapter according to an embodiment of the present invention.
Figure 19:
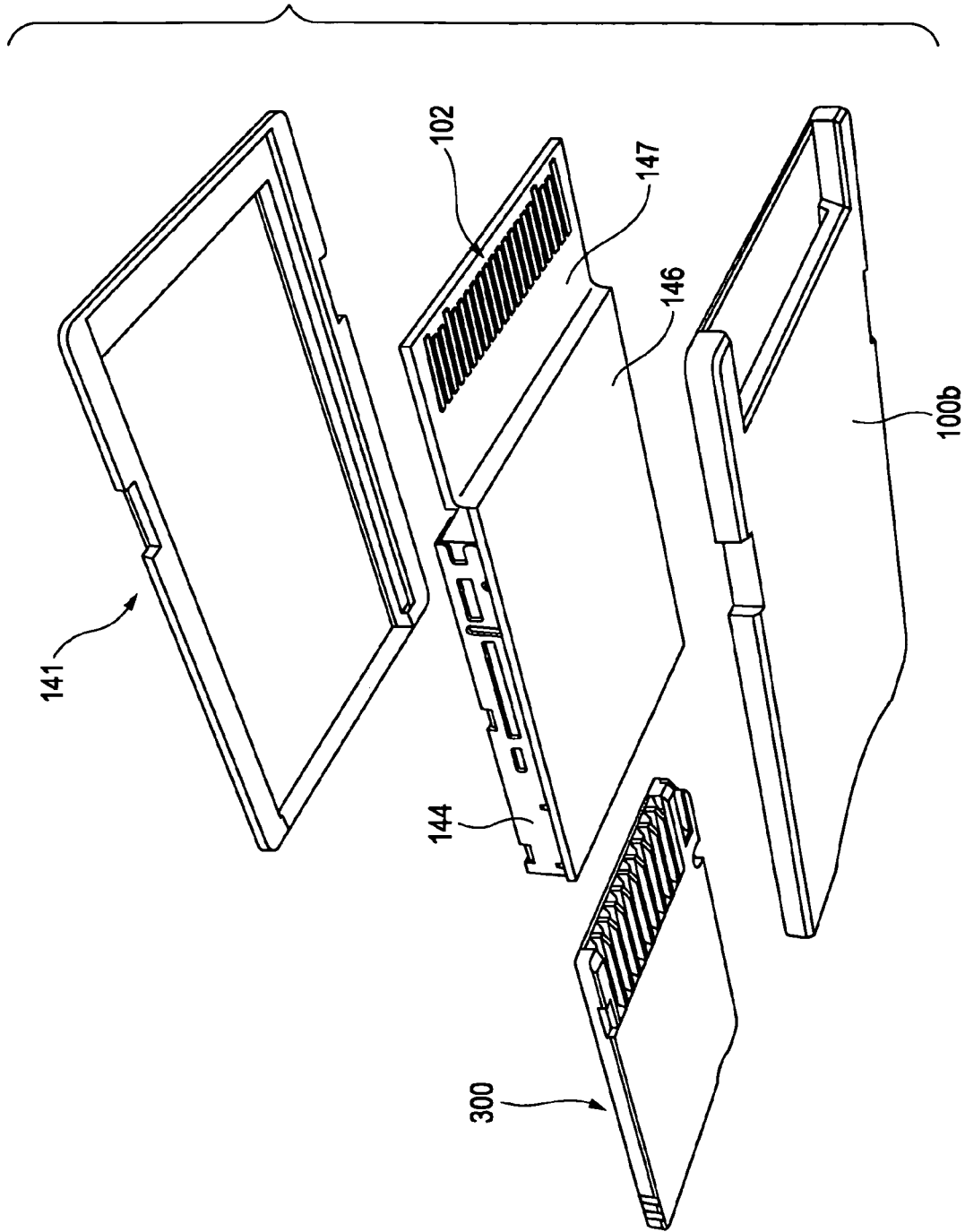
FIG. 19 is a diagram showing an exploded perspective view of the card-type peripheral device shown in FIG. 18, as seen from below.

FIG. 18 is an exploded perspective view illustrating main parts of the card-type peripheral device functioning as the card adapter according to the present embodiment. FIG. 19 is a diagram showing an exploded perspective view seen from below in FIG. 18.

The card adapter 100A includes a card receiving unit 144 having a space 143 between a first case part (an upper case part) 141 and a second case part (a lower case part) 142. The space 143 is formed so as to be capable of receiving a small-size card (the memory stick Duo (registered trademark) 300 in this specific example). The card adapter 100A also includes circuit boards 146 and 147 and a connector 145 that is disposed at a front end of the card receiving unit 144 and that is removably connected to the terminal part 310 of the small-size card 300.

In this card adapter 100A, the circuit board is divided into two parts, i.e., the circuit board 146 and the circuit board 147 located at different heights. These two circuit boards 146 and 147 are electrically connected to each other via a flexible cable that is not shown in FIG. 18. The card receiving unit 144 is disposed on the circuit board 146, and a terminal part 102 is formed on a back surface of the circuit board 147. An interface (I/F) conversion controller 148 is disposed on the circuit board 147. A slot 149 via which to receive the small-size card is formed between the first case part 141 and the second case part 142, at a rear end thereof. At the rear end of the second case part 142, a cutout 1421 is formed to ease accessing to the grip or the notch formed on the card-type peripheral device 100 when the inserted card is pulled out. In this configure, the card adapter 100A also has a terminal cover similar to that described above.

Figure 20:
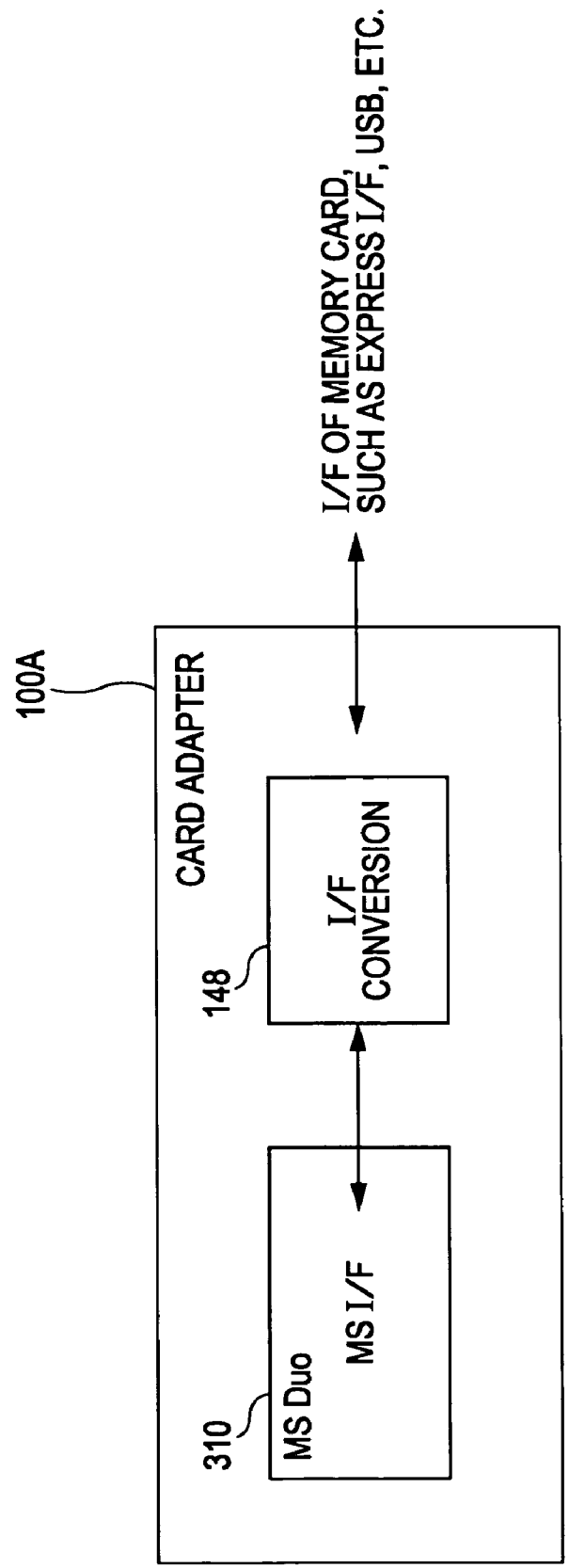
FIG. 20 is a block diagram of an interface of a card adapter.

FIG. 20 is a block diagram of the interface of the card adapter.

In the card adapter 100A designed for using the memory stick Duo (registered trademark) 300 in the small-size card slot, it is necessary to internally convert the interface in the card adapter 100A to accommodate the difference in interface between the memory stick Duo (registered trademark) 300 and the Express interface or the USB interface having the small-size slot. For this purpose, the above-described I/F conversion controller 148 is provided.

The Express interface is excellent in that it allows a signal to be transmitted at a high transmission rate. However, the Express interface needs a complicated conversion circuit and needs high consumption power. On the other hand, the USB interface is lower in transmission rate, although the conversion circuit is simpler. When the card-type peripheral device has both interfaces, a circuit for conversion to one the interfaces may be provided.

As described above, by attaching the card adapter according to the present embodiment to the small-size memory card having the interface according to the Express interface standard that allows high-speed data transmission, it becomes possible to achieve the compatibility with the Express card. This adapter card is configured to be greater in with, length, and thickness than the memory stick (registered trademark) or the SD (registered trademark) card, so that the memory stick or the SD card can be disposed in the adapter card. The adapter card is configured so as to have either the shape with the terminal cover or the shape with no terminal cover. In either case, the adapter card is configured so that the connector can be connected to the adapter card. The use of the terminal cover prevents the terminals from being touched with a finger or the like of a person even when the small-size card has a large number of terminals, thereby preventing the terminals from being contaminated, which can cause the small-size card to operate erroneously. Furthermore, the terminal cover is made of an electrically conductive material and the terminal cover is connected to the common terminal (the ground terminal) to shunt static electricity to the common terminal thereby preventing the card from being destroyed by static electricity.

In the embodiments described above, the card-type peripheral device 100 is configured so as to function as a memory card or a card adapter. If conditions in terms of the chip size of the flash memory etc. are satisfied, the card-type peripheral device 100 may be configured so as to have functions of both a memory card and a card adapter. It should be understood by those skilled in the art that various modifications, combinations, sub-combinations and alterations may occur depending on design requirements and other factors insofar as they are within the scope of the appended claims or the equivalents thereof.

What is claimed is:

1. A card-type peripheral device comprising:
an electronic component disposed in a case; and
a terminal part including connection terminals connectable with terminals of a to-be-connected device, wherein
a function of the electronic component and the number of terminals of the terminal part are maintained to be compatible with those of the to-be-connected device, the number of terminals of the terminal part being less than the number of terminals of the to-be-connected device, wherein the electronic component includes a nonvolatile memory and functions as a memory card capable of writing and reading data via an interface,
outside dimensions of the case are set to be smaller than outside dimensions of a standard PCI Express card medium and greater than outside dimensions of a memory stick Duo (registered trademark) or an SD (registered trademark) card,
the terminal part is formed so as to be exposed via a part of the case, and
a terminal cover receiving part is formed in the case, the terminal cover receiving part being capable of fitting with a terminal cover configured to cover the exposed portion of the terminal part while maintaining an opening that allows a connector of the to-be-connected device to enter therethrough.

2. The card-type peripheral device according to claim 1, wherein the terminal cover is formed of an electrically conductive material, and the terminal cover has a contact part connectable with a common terminal in a state in which the terminal cover is disposed on the terminal cover receiving part.

3. The card-type peripheral device according to claim 2, wherein the common terminal is formed on a circuit board.

* * * * *